United States Patent
Pedersen

(10) Patent No.: US 9,782,838 B2
(45) Date of Patent: Oct. 10, 2017

(54) HEIGHT ADJUSTING SWIVEL DRILL BLOCK

(71) Applicant: The Boeing Company, Chicago, IL (US)

(72) Inventor: Aaron J. Pedersen, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 52 days.

(21) Appl. No.: 14/877,266

(22) Filed: Oct. 7, 2015

(65) Prior Publication Data
US 2017/0100782 A1    Apr. 13, 2017

(51) Int. Cl.
*B23B 47/28* (2006.01)
*B23B 49/02* (2006.01)

(52) U.S. Cl.
CPC ........... *B23B 49/026* (2013.01); *B23B 47/28* (2013.01); *B23B 49/023* (2013.01); *B23B 2215/04* (2013.01); *B23B 2247/12* (2013.01); *B23B 2260/004* (2013.01); *B23B 2270/34* (2013.01)

(58) Field of Classification Search
CPC .............. Y10T 408/55; Y10T 408/561; Y10T 408/563; Y10T 408/567; Y10T 408/568; Y10T 408/569; Y10T 408/57; Y10T 408/60; B23B 47/28; B23B 47/287; B23B 47/288; B23B 49/02; B23B 49/023; B23B 2247/04; B23B 2247/10; B23B 2247/12; B23B 2247/00; B23B 2270/12
See application file for complete search history.

(56) References Cited

U.S. PATENT DOCUMENTS

| | | | | |
|---|---|---|---|---|
| 2,928,298 A | * | 3/1960 | Roberts ................... | B23B 47/28 408/97 |
| 3,068,577 A | * | 12/1962 | Wilson ..................... | B43L 9/00 33/27.02 |
| 3,069,933 A | * | 12/1962 | McCall .................... | B23B 47/28 408/109 |
| 3,148,562 A | * | 9/1964 | Moss ....................... | B23B 47/28 33/628 |
| 3,804,546 A | * | 4/1974 | Boyajian ................. | B23B 49/02 408/115 R |
| 3,977,805 A | * | 8/1976 | Wanous ................... | B23B 41/12 29/255 |
| 4,199,283 A | * | 4/1980 | Perry ...................... | B25H 1/0078 408/115 R |

(Continued)

FOREIGN PATENT DOCUMENTS

| | | | | |
|---|---|---|---|---|
| GB | 645227 A | * | 10/1950 | ............. B23B 47/28 |
| GB | 882233 A | * | 11/1961 | ............. B23B 47/28 |

*Primary Examiner* — Daniel Howell
*Assistant Examiner* — Nicole N Ramos
(74) *Attorney, Agent, or Firm* — MH2 Technology Law Group LLP

(57) ABSTRACT

A drill block and a method for drilling a hole through a workpiece using the drill block. The drill block may include a mounting leg for mounting the drill block, a drilling support leg having a round hole therethrough operable to receive a drill bit during a drilling operation, and a height variability leg interposed between the mounting leg and the drilling support leg, wherein the height variability leg is adjustable to select a vertical height of the drilling support leg relative to the mounting leg.

20 Claims, 4 Drawing Sheets

(56) References Cited

U.S. PATENT DOCUMENTS

| | | | | |
|---|---|---|---|---|
| 4,759,666 A | * | 7/1988 | Grab | B23B 47/28 |
| | | | | 408/115 B |
| 5,051,045 A | * | 9/1991 | Bonde | B23B 49/02 |
| | | | | 408/115 R |
| 5,785,466 A | * | 7/1998 | Haynes | B23B 41/12 |
| | | | | 408/103 |
| 5,807,033 A | * | 9/1998 | Benway | B23B 47/288 |
| | | | | 144/346 |
| 7,229,237 B1 | * | 6/2007 | Fulgham | B23B 47/284 |
| | | | | 408/115 R |
| 2012/0257938 A1 | * | 10/2012 | Adkins | B23B 47/288 |
| | | | | 408/115 R |

\* cited by examiner

HEIGHT ADJUSTING SWIVEL DRILL BLOCK

TECHNICAL FIELD

The present teachings relate to the field of drilling tools and, more particularly, to a drill block for aligning a drill bit to a surface of a structure to be drilled.

BACKGROUND

During the manufacture and assembly of performance vehicles such as aircraft, a subassembly must be attached to a supporting substrate with a high degree of precision to ensure efficient operation. To assist with precision alignment, one or more reference holes may be molded into, or predrilled through, the subassembly during manufacture. The reference holes in the subassembly are used to identify the location of holes that are to be drilled through the supporting substrate.

To attach the subassembly to the supporting substrate, an edge of the subassembly may be placed in physical contact with an edge of the supporting substrate to ensure the subassembly is properly aligned with the supporting substrate. A drill bit is inserted through the reference hole in the subassembly, and then a hole is drilled through the supporting substrate using the reference hole in the subassembly to properly locate the hole through the supporting substrate. Any remaining holes are then similarly drilled using the reference holes in the subassembly to properly locate the holes in the supporting substrate.

Even though the reference holes through the subassembly are effective in ensuring that the entrance location of each hole drilled through the supporting substrate is correct, maintaining the drill bit exactly perpendicular to the supporting substrate to ensure the proper exit location of each hole is more difficult. For example, if a drill bit is improperly angled 7° away from vertical during drilling through a material that is 2.5" thick, the hole will exit the material almost 3/16" away from its correct location.

Assembly personnel may simply attempt to maintain the drill bit in a vertical position without any mechanical aid other than the reference holes through the subassembly, but this method is inaccurate and varies greatly with the attention and experience of individual assembly personnel. A handheld drill block may be used but the drill block may be only slightly larger than the hole to be drilled, and thus manual alignment of the drill block is difficult and misaligned holes is common. Further, the drill may pitch and yaw during drilling, thereby resulting in an oversized hole. Alignment jigs can be effective in assisting with maintaining perpendicularity of the drill bit with a supporting surface. However, alignment jigs are typically customized for the shape, topography, and desired hole location of one particular surface and are thus not functional with surfaces having a different shape, topography, or desired hole location. Further, alignment jigs may rely on proper alignment and stabilization by assembly personnel as the hole is being drilled. Additionally, during the assembly of aircraft or other structures, many different types of subassemblies must be attached to a supporting substrate which would require different alignment jigs of varying designs, and thus the use of customized alignment jigs is not practical.

A tool that assisted with reliably drilling vertical holes through surfaces having different surface shapes and topographies would be desirable.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an embodiment, a drill block can include a mounting leg for mounting the drill block, a drilling support leg having a round hole therethrough operable to receive a drill bit during a drilling operation, and a height variability leg interposed between the mounting leg and the drilling support leg, wherein the height variability leg is adjustable to select a vertical height of the drilling support leg relative to the mounting leg. The drill block may further include a first swivel leg attached to the mounting leg and the height variability leg, wherein the first swivel leg is adjustable to select a first horizontal placement of the drilling support leg, and a second swivel leg attached to the height variability leg and the drilling support leg, wherein the second swivel leg is adjustable to select a second horizontal placement of the drilling support leg. In an embodiment, the drill block may further include a first fastener that extends through the mounting leg and the first swivel leg, wherein the first fastener is configured to be loosened to adjust the first swivel leg to position the drilling support leg, and is further configured to be tightened to secure the first swivel leg to the mounting leg, and may further include a second fastener that extends through the first swivel leg and the height variability leg, wherein the second fastener is configured to be loosened to adjust the height variability leg to position the drilling support leg, and is further configured to be tightened to secure the height variability leg to the first swivel leg. The drill block may further include a third fastener that extends through the height variability leg and the second swivel leg, wherein the third fastener is configured to be loosened to adjust the height variability leg to position the drilling support leg, and is further configured to be tightened to secure the height variability leg to the second swivel leg. The drill block may also include a fourth fastener that extends through the second swivel leg and the drilling support leg, wherein the fourth fastener is configured to be loosened to adjust the drilling support leg and is further configured to be tightened to secure the drilling support leg to the second swivel leg. In an embodiment, the drill block may include at least one drill bushing including the round hole therethrough operable to receive the drill bit during the drilling operation and an elongated cavity through the drilling support leg, wherein the elongated cavity through the drilling support leg is configured to receive the drill bushing during the drilling operation, and may include an elongated cavity through the mounting leg and a main mounting bolt, wherein the elongated cavity is configured to receive the main mounting bolt during the drilling operation.

In another embodiment, a method for drilling a hole through a workpiece can include attaching a mounting leg of a drill block to the workpiece, loosening a first fastener that attaches a first swivel leg to the mounting leg, and adjusting a horizontal position of a drilling support leg by swiveling the first swivel leg on the first fastener, then tightening the first fastener to secure the first swivel leg to the mounting leg. The method can further include loosening a second fastener that attaches the first swivel leg to a height variability leg, and adjusting a vertical position of the drilling support leg by pivoting the height variability leg on the second fastener, then tightening the second fastener to secure the height variability leg to the first swivel leg. The method may further include loosening a third fastener that attaches a second swivel leg to the height variability leg, adjusting the vertical position of the drilling support leg by pivoting the second swivel leg on the third fastener, then tightening the third fastener to secure the second swivel leg to the height variability leg. An embodiment may include loosening a fourth fastener that attaches the second swivel leg to the drilling support leg, and adjusting a horizontal position of a drilling support leg by swiveling the second swivel leg on the fourth fastener, then tightening the fourth fastener to secure the drilling support leg to the second swivel leg. Additionally, the method may include positioning a drill bushing within an elongated cavity in the drilling support leg, placing a drill bit within a round hole in the drill bushing, and drilling a hole in the workpiece with the drill bit within the round hole in the drill bushing. An embodiment may further include aligning a component including a preformed reference hole to the workpiece, adjusting the horizontal position and the vertical position of the drilling support leg to position the round hole in the drill bushing with the preformed reference hole and, with the round hole in the drill bushing positioned over the preformed reference hole, placing the drill bit within the reference hole and drilling the hole in the workpiece. In an embodiment, the reference hole may be a first reference hole and the hole in the workpiece may be a first hole in the workpiece, and the method can further include placing a temporary fastener through the first reference hole and the first hole in the workpiece to secure the component to the workpiece, repositioning the drill block using a method including loosening at least one of the first fastener, the second fastener, the third fastener, and the fourth fastener to position the round hole in the drill bushing over a second reference hole, after repositioning the drill block, tightening at least one of the first fastener, the second fastener, the third fastener, and the fourth fastener, and placing the drill bit within the round hole in the drill bushing, and drilling a second hole in the workpiece with the drill bit through the second reference hole

BRIEF DESCRIPTION OF THE DRAWINGS

The accompanying drawings, which are incorporated in, and constitute a part of this specification, illustrate embodiments of the present teachings and, together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

As discussed above, drilling a perpendicular hole through a substrate is difficult to perform, even with the use of preformed reference holes through the subassembly that is being attached to the substrate. Assembly personnel may attempt to maintain the drill bit in a vertical position without any mechanical aid other than the reference holes through the subassembly, which is inaccurate, or an alignment jig may be used, but an alignment jig must be tailored for the topography of the subassembly that is being attached to the substrate.

A drill block according to an embodiment of the present teachings can be used to drill a vertical hole reliably and accurately through a substrate. Additionally, the drill block can be set into a number of different configurations to enable its use with subassemblies having different topographies.

Figure 1:
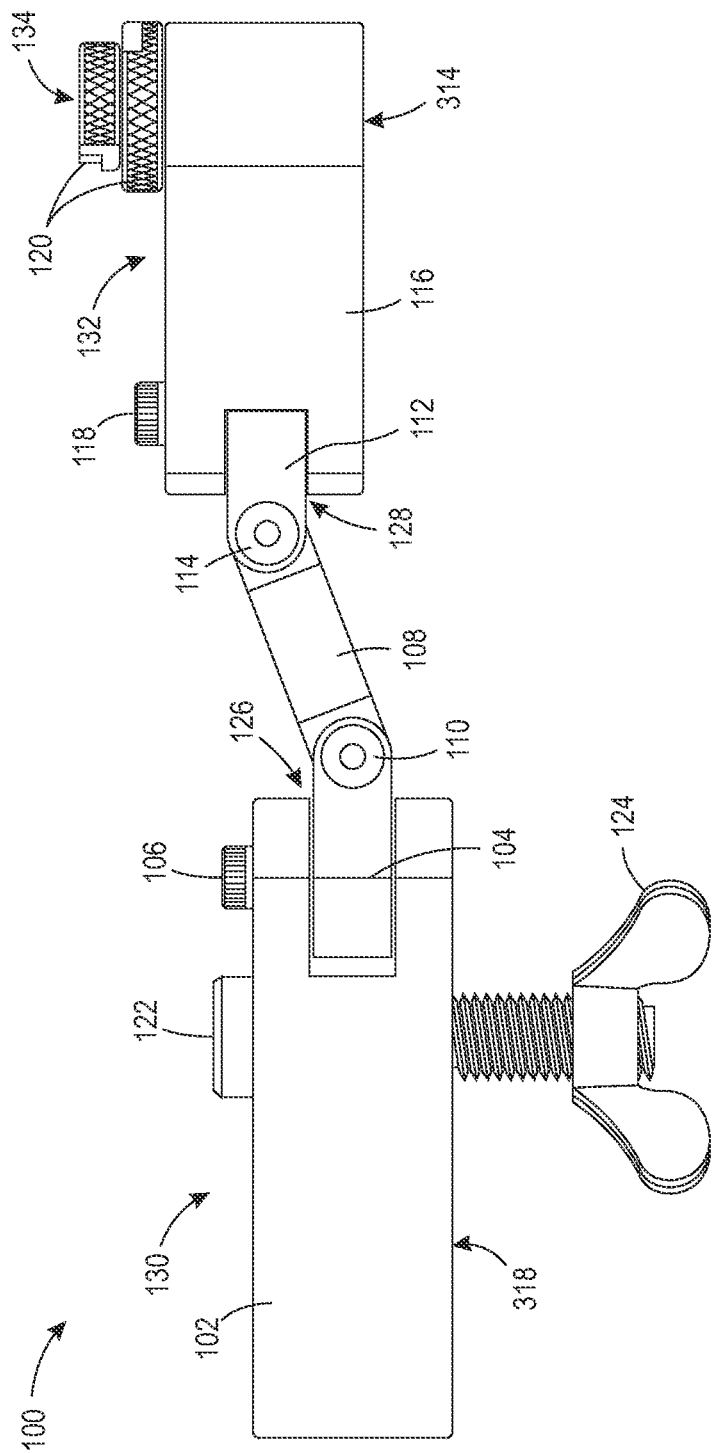
FIG. 1 is a side view.
Figure 2:
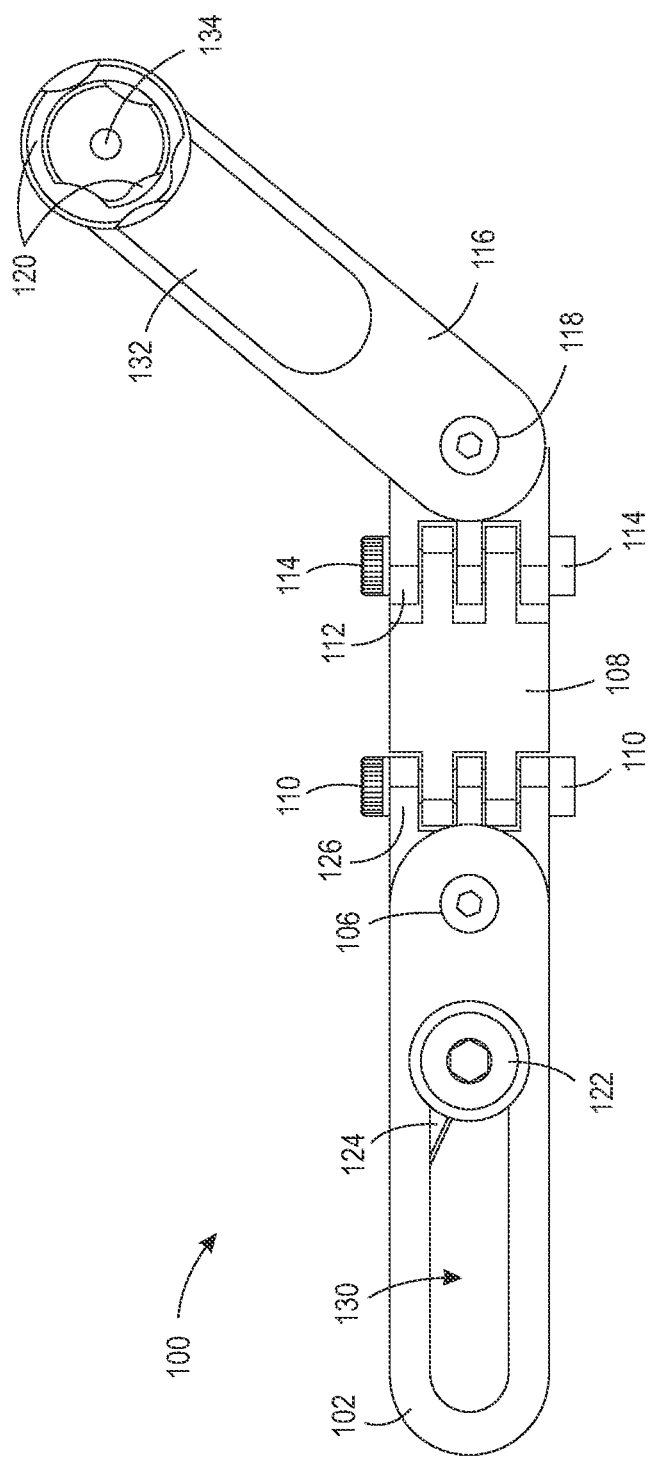
FIG. 2 is a top view, of a drill block in accordance with an embodiment of the present teachings.

FIG. 1 is a side view, and FIG. 2 is a top view, of a drill block 100 according to an embodiment of the present teachings. In this embodiment, the drill block 100 may include a mounting leg 102, a first swivel leg 104 rotatably secured to the mounting leg 102 with a first fastener 106, a height variability leg 108 hinged with, and movably secured to the first swivel leg 104 with a second fastener 110, a second swivel leg 112 hinged with, and movably secured to, the height variability leg 108 with a third fastener 114, a drilling support leg 116 movably secured to the second swivel leg 112 with a fourth fastener 118, one or more drill bushings or drill guides 120 each having a round hole 134 therethrough that receives a drill bit (not depicted for simplicity), and a main mounting bolt 122 that may be secured to the mounting leg 102 with a wing nut 124.

The first fastener 106 may be a bolt, quick release skewer, etc., that may be loosened such that the first swivel leg 104 may rotate back and forth within a groove or slot 126 in the mounting leg 102 and tightened to secure the first swivel leg 104 within the groove 126 and onto the mounting leg 102. The first fastener 106 may include a grooved or knurled surface to facilitate hand tightening, or a slotted recess to facilitate tightening with a tool such as a hex key or star key. In an embodiment, the first swivel leg 104 may swivel or pivot horizontally within the groove 126 through about 175°, depending on the design.

The second fastener 110 and third fastener 114 may each be bolts, quick release skewers, etc. The second fastener 110 attaches a first end of the height variability leg 108 to the first swivel leg 104 and the third fastener 114 attaches a second end of the height variability leg 108 to the second swivel leg 112. The second fastener 110 may be loosened to allow the height variability leg 108 to pivot on the second fastener 110 and tightened to secure the height variability leg 108 to the first swivel leg 104. The third fastener 114 may be loosened to allow the second swivel leg 112 to pivot on the third fastener 114 and tightened to secure the second swivel leg 112 to the height variability leg 108. The second fastener 110 and the third fastener 114 may each include grooved or knurled surfaces to facilitate hand tightening, or a slotted recess to facilitate tightening with a tool such as a hex key or star key. In an embodiment, the height variability leg 108 may swivel or pivot on the second fastener 110 through 180° or more, and the second swivel leg 112 may pivot on the third fastener 114 through 180° or more, depending on the design.

The second swivel leg 112 may be positioned within a groove or slot 128 in the drilling support leg 116. The fourth fastener 118 may be a bolt, quick release skewer, etc., that may be loosened such that the drilling support leg 116 may rotate back and forth within the groove 128. Further, the fourth fastener 118 may be tightened to secure the second swivel leg 112 within the groove 128 and to secure the drilling support leg 116 to the second swivel leg 112. The second fastener 118 may include a grooved or knurled surface to facilitate hand tightening, or a slotted recess to facilitate tightening with a tool such as a hex key or star key. In an embodiment, the drilling support leg 116 may swivel or pivot horizontally through about 175°, depending on the design.

The main mounting bolt 122 may be placed through an elongated hole or cavity 130 that extends through the mounting leg 102. The one or more drill bushings 120 may be placed into an elongated hole or cavity 132 that extends through the drilling support leg 116.

Figure 3:
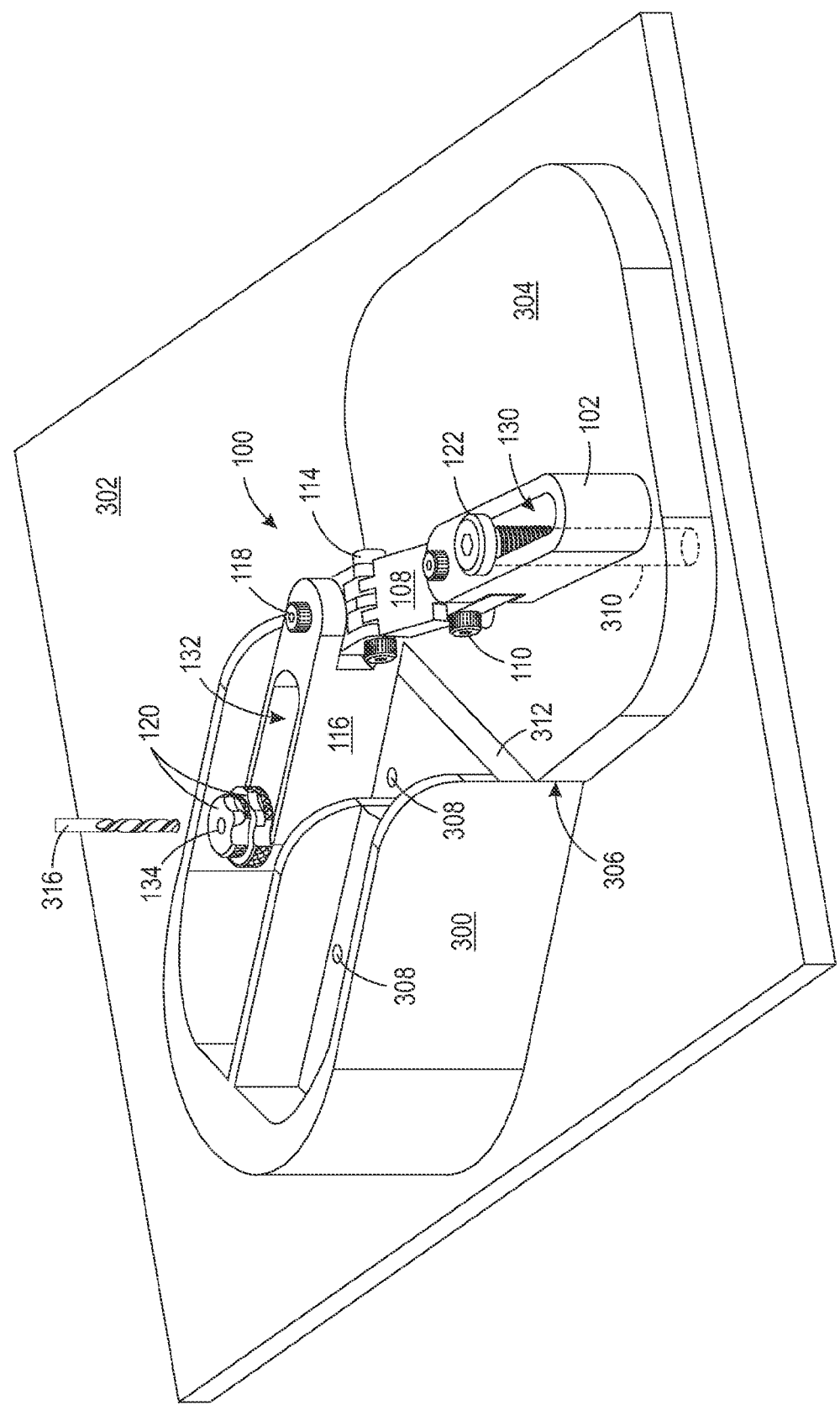
FIGS. 3 and 4 are perspective depictions of a drill block in accordance with an embodiment of the present teachings during use.

The drill block 100 may be used during a drilling operation to drill one or more holes into or through a workpiece such as a substrate. In the exemplary depiction of FIG. 3, the drill block 100 may be used to attach a component 300 such as a stiffening component to a substrate 302 such as a composite skin of an aircraft. In this embodiment, a frame structure 304 has been attached to the substrate 302, and an edge 306 of the frame structure 304 may be used as an alignment aid to attach the component 300. The component 300 may have one or more predrilled reference holes 308.

To attach the component 300, the drill block 100 is attached to the substrate 302 and to the frame structure 304 by inserting the shaft of the main mounting bolt 122 through the elongated cavity 130 in the mounting leg 102 and through a hole 310 in the frame component 304 and the substrate 302. The main mounting bolt 122 may be secured with the wing nut 124 on the opposite side of the substrate 302. During the attachment of the drill block 100 to the substrate 302, the elongated cavity 130 allows the position of the mounting leg to be adjusted rotationally and laterally (back and forth) to work around any surface features that may otherwise prevent positioning of the drill block 100.

Either before or after attachment of the drill block 100 to the substrate 302, the component 300 may be positioned on the substrate 302. In this embodiment, an edge 312 of the component 300 may be placed against the reference edge 306 of the frame structure 304 to properly orient the frame structure 304 relative to the substrate 302. The component 300 may be held in place using, for example, a clamp or other temporary attachment (not individually depicted for simplicity).

Next, the drill block 100 and drill bushing 120 are adjusted so that the hole 134 through the drill bushing 120 is aligned over one of the reference holes 308 in the component 300. Adjustment of the drill block 100 may be performed by loosening each of the fasteners 106, 110, 114, and 118, and pivoting the first swivel leg 104 and the second swivel leg 112, and adjusting the height of the drilling support leg 116 by pivoting the height variability leg 108 on the second fastener 110 and the third fastener 114. A surface 314 of the drilling support leg 116, such as a flat lower surface, rests on a surface, such as a flat surface, of the component 300. The elongated cavity 132 which receives the drill bushing 120 allows the position of the drill bushing 120 to be adjusted in a horizontal direction, thereby improving adjustability of the drill bushing 120 and drill block 100 to work around any surface features that may otherwise prevent positioning of the drill block 100. A drill bit 316 may be positioned through the hole 134 in the drill bushing 120 and into the reference hole 308 to properly align the hole 134 in the drill bushing 120 with the reference hole 308.

Once the drill bushing 120 is properly positioned over the component 300, for example, over one of the reference holes 308, each of the first fastener 106, the second fastener 110, the third fastener 114, and the fourth fastener 118 are tightened to secure the aligned position of the drill block 100.

Figure 4:
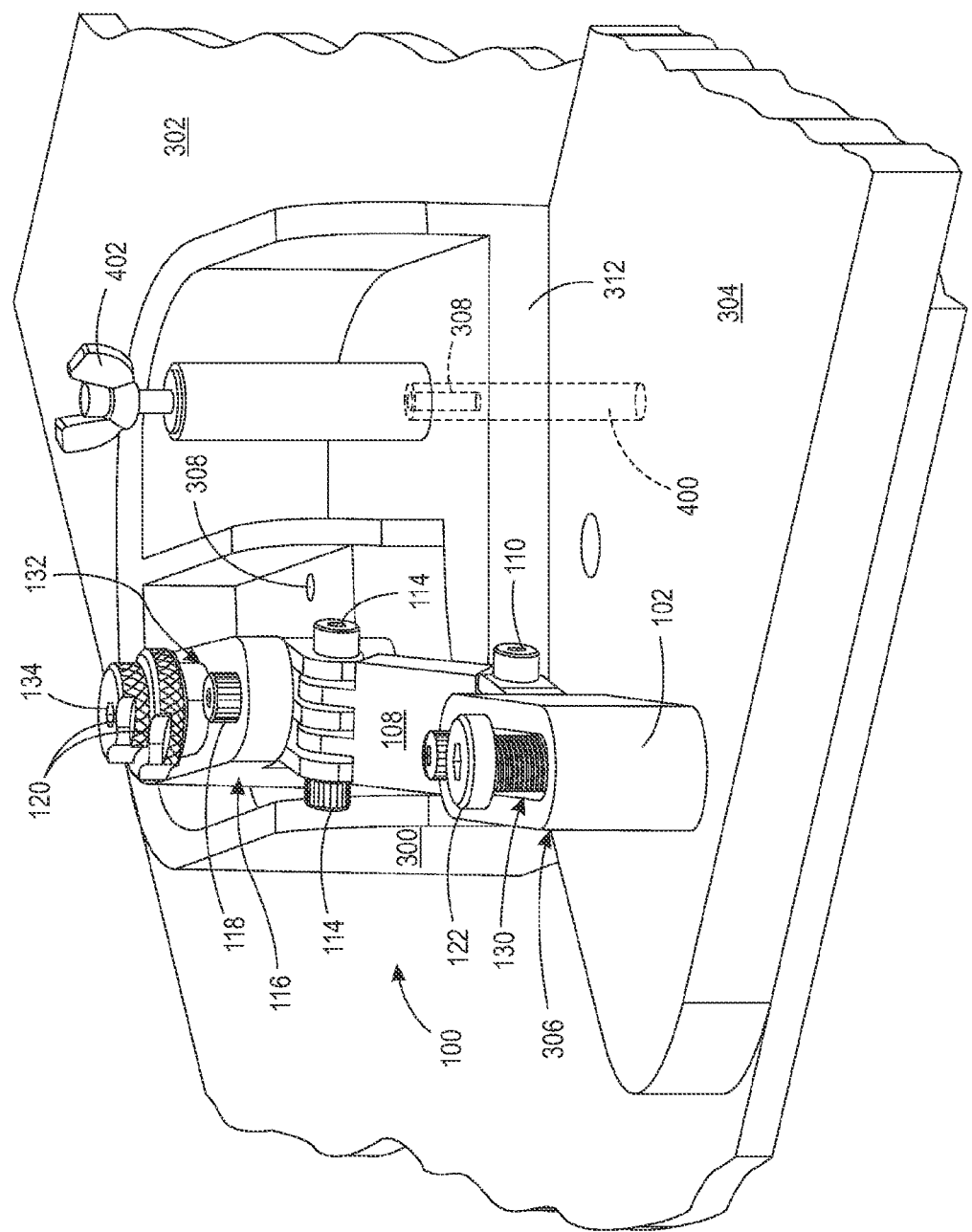

Subsequently, a drill bit 316 attached to a drill (not individually depicted for simplicity) is placed through the hole 134 in the drill bushing 120, and is used to drill a hole into or through the substrate 302. During a drilling operation, the drill bushing 120 rests on an upper surface of the drilling support leg 116. The drill bushing 120 may be secured manually during the drilling to prevent any back and forth movement within the elongated cavity 132, while a relatively tight tolerance of the drill bushing 120 within the elongated cavity 132 prevents side-to-side movement. Two or more drill bushings 120 may be used to drill successively larger holes until a hole 400 (FIG. 4) of a desired size is formed into or through the substrate 302. FIG. 4 depicts the reference hole 308 prior to drilling, and the completed hole 400 after drilling, in phantom.

After the hole 400 is drilled into or through the substrate 302, the component 300 may be permanently secured to the substrate 302 using a bolt or other fastener, or the component 300 may be temporarily secured using, for example, a blind grip fastener 402 such as an alignment cleco. Any other fastener such as a clamp used to temporarily secure the component 300 to the substrate 302 may be removed to permit access to other drill locations, or left in place if it does not obstruct access to the other drill location.

If additional holes are to be drilled, one, some, or all of the fasteners 106, 110, 114, and 118 and main mounting bolt 122 may be loosened as necessary or desired to permit readjustment of the drill block 100 and, particularly, the drill bushing 120, to another hole location.

When placed in a flat orientation, with surface 314 of the drilling support leg 116 level or coplanar with a surface with a surface 318 of the mounting leg, the drill block 100 may have a length of from, for example, about 6.0 inches to about 9.0 inches, or about 7.0 inches. The drill block 100 may further have a height of from about 1.0 inch to about 2.0 inches, for example, about 1.25 inches (excluding bolt 122, wing nut 124, and fasteners 106, 118). Additionally, the drill block 100 may have a width of from about 0.75 inches to about 1.25 inches, for example, about 1.0 inch. The drill block 100 may thus have a compact size that can fit within tight or enclosed spaces and around obstructions. It will be appreciated that a drill block 100 according to the present teachings may have other dimensions outside of these stated ranges, depending on the design and intended use of the drill block 100.

The drill block may be manufactured from one or more materials, including, for example, a metal or metal alloy such as stainless steel or aluminum, or a synthetic polymer. Different subassemblies of the drill block may be manufactured from different materials. It will be appreciated that the FIGS. are schematic depictions, and a drill block in accordance with an embodiment may include other elements that are not depicted for simplicity, while depicted elements may be removed or modified.

As depicted in FIG. 1, the first swivel leg 104 is attached to, and interposed between, the mounting leg 102 and the height variability leg 108, and the second swivel leg 112 is attached to, and interposed between, the height variability leg 108 and the drilling support leg 116. The first swivel leg 104, the height variability leg 108, and the second swivel leg 112 are each interposed between the mounting leg 102 and the drilling support leg 116, and the height variability leg 108 is interposed between the first swivel leg 104 and the second swivel leg 112.

The drill block according to the present teachings may thus include a swivel head and height adjuster that may enable an assembly personnel to fasten the drill block to the existing structure, align the drill block guide over the hole to be drilled, and drill a vertical hole that is 90° or perpendicular to the surface being drilled. The drill block is thus configurable to lift the drilling support leg 116 to the height level of the component 300 being drilled while also swiveling to maneuver around obstructions from supporting panels and other structures that are on, or a part of, the substrate 302. The first swivel leg 104 may be swiveled on the first fastener 106, and the second swivel leg 112 may be swiveled on the fourth fastener 118, to adjust a horizontal position of the drilling support leg 116. The height variability leg 108 may be pivoted on the second fastener 110 and the third fastener 114 to adjust a vertical position of the drilling support leg relative to the mounting leg 102. In some implementations, the drill block may be only slightly larger than the drill hole, and the drill block may fit between structures and into small spaces where prior alignment jigs could not, thus enabling faster, more precise drilling and decreased rework and manufacturing costs.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A drill block, comprising:
   a mounting leg for mounting the drill block;
   a drilling support leg having a round hole therethrough operable to receive a drill bit during a drilling operation;
   a height variability leg interposed between the mounting leg and the drilling support leg, wherein the height variability leg is adjustable to select a vertical height of the drilling support leg relative to the mounting leg;
   a first swivel leg attached to the mounting leg and the height variability leg, wherein the first swivel leg is adjustable to select a first horizontal placement of the drilling support leg; and
   a second swivel leg attached to the height variability leg and the drilling support leg, wherein the second swivel leg is adjustable to select a second horizontal placement of the drilling support leg.

2. The drill block of claim 1, further comprising a first fastener that extends through the mounting leg and the first swivel leg, wherein the first fastener is configured to be loosened to adjust the first swivel leg to position the drilling support leg, and is further configured to be tightened to secure the first swivel leg to the mounting leg.

3. The drill block of claim 2, further comprising a second fastener that extends through the first swivel leg and the height variability leg, wherein the second fastener is configured to be loosened to adjust the height variability leg to position the drilling support leg, and is further configured to be tightened to secure the height variability leg to the first swivel leg.

4. The drill block of claim 3, further comprising a third fastener that extends through the height variability leg and the second swivel leg, wherein the third fastener is configured to be loosened to adjust the height variability leg to position the drilling support leg, and is further configured to be tightened to secure the height variability leg to the second swivel leg.

5. The drill block of claim 4, further comprising a fourth fastener that extends through the second swivel leg and the drilling support leg, wherein the fourth fastener is configured to be loosened to adjust the drilling support leg and is further configured to be tightened to secure the drilling support leg to the second swivel leg.

6. The drill block of claim 1, further comprising:
at least one drill bushing comprising the round hole therethrough operable to receive the drill bit during the drilling operation; and
an elongated cavity through the drilling support leg, wherein the elongated cavity through the drilling support leg is configured to receive the drill bushing during the drilling operation.

7. The drill block of claim 1, further comprising:
an elongated cavity through the mounting leg; and
a main mounting bolt,
wherein the elongated cavity is configured to receive the main mounting bolt during the drilling operation.

8. A drill block, comprising:
a mounting leg for mounting the drill block to a surface;
a drilling support leg having a hole therethrough operable to receive a drill bit during drilling of a structure to be drilled; and
a height variability leg interposed between the mounting leg and the drilling support leg, wherein the height variability leg is adjustable to select a height of the drilling support leg relative to the mounting leg, and is thereby adjustable to adjust a distance of the drilling support leg relative to the surface, while the drill block is attached to the surface.

9. The drill block of claim 8, further comprising:
a first swivel leg attached to the mounting leg and the height variability leg, wherein the first swivel leg is adjustable to select a first lateral placement of the drilling support leg relative to the mounting leg; and
a second swivel leg attached to the height variability leg and the drilling support leg, wherein the second swivel leg is adjustable to select a second lateral placement of the drilling support leg relative to the mounting leg.

10. The drill block of claim 9, further comprising a first fastener that extends through the mounting leg and the first swivel leg, wherein the first fastener is configured to be loosened to adjust the first swivel leg to position the drilling support leg, and is further configured to be tightened to secure the first swivel leg to the mounting leg.

11. The drill block of claim 10, further comprising a second fastener that extends through the first swivel leg and the height variability leg, wherein the second fastener is configured to be loosened to adjust the height variability leg to position the drilling support leg, and is further configured to be tightened to secure the height variability leg to the first swivel leg.

12. The drill block of claim 8, wherein the mounting leg of the drill block is mounted to a surface.

13. The drill block of claim 8, further comprising:
an elongated cavity through the mounting leg; and
a main mounting bolt that extends through the elongated cavity and the surface, and is configured to attach the drill block to the surface during the drilling of the structure to be drilled.

14. The drill block of claim 8 wherein, when a lower surface of the mounting leg is level or coplanar with a lower surface of the drilling support leg, the drill block has a length of from 6 inches to 9 inches.

15. The drill block of claim 14 wherein, when the lower surface of the mounting leg is level or coplanar with the lower surface of the drilling support leg, the drill block has a height of from 1 inch to 2 inches.

16. A drill block, comprising:
a mounting leg configurable for mounting the drill block to a horizontal surface;
a drilling support leg having a hole therethrough operable to receive a drill bit during a drilling operation; and
a height variability leg interposed between the mounting leg and the drilling support leg, wherein the height variability leg is adjustable to select a vertical height of the drilling support leg relative to the mounting leg and relative to the horizontal surface while the drill block is attached to the horizontal surface.

17. The drill block of claim 16, further comprising:
a first swivel leg attached to the mounting leg and the height variability leg, wherein the first swivel leg is adjustable to select a first lateral placement of the drilling support leg relative to the mounting leg; and
a second swivel leg attached to the height variability leg and the drilling support leg, wherein the second swivel leg is adjustable to select a second lateral placement of the drilling support leg relative to the mounting leg.

18. The drill block of claim 17, further comprising:
a first fastener that extends through the mounting leg and the first swivel leg, wherein the first fastener is configured to be loosened to adjust the first swivel leg to position the drilling support leg, and is further configured to be tightened to secure the first swivel leg to the mounting leg; and
a second fastener that extends through the first swivel leg and the height variability leg, wherein the second fastener is configured to be loosened to adjust the height variability leg to position the drilling support leg, and is further configured to be tightened to secure the height variability leg to the first swivel leg.

19. The drill block of claim 16, wherein the mounting leg of the drill block is attached to a horizontal surface.

20. The drill block of claim 16 wherein, when a lower surface of the mounting leg is level or coplanar with a lower surface of the drilling support leg, the drill block:
has a length of from 6 inches to 9 inches;
has a height of from 1 inch to 2 inches; and
has a width of from 0.75 inches to 1.25 inches.

* * * * *